(12) United States Patent
Tillotson

(10) Patent No.: US 11,286,063 B2
(45) Date of Patent: Mar. 29, 2022

(54) PARTICLE DISPERSION LAYER HAVING PERSISTENT MAGNETIC FIELD

(71) Applicant: The Boeing Company, Chicago, IL (US)

(72) Inventor: Brian Tillotson, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 636 days.

(21) Appl. No.: 16/413,450

(22) Filed: May 15, 2019

(65) Prior Publication Data

US 2020/0361638 A1 Nov. 19, 2020

(51) Int. Cl.
*B64G 1/54* (2006.01)

(52) U.S. Cl.
CPC .................... *B64G 1/546* (2013.01)

(58) Field of Classification Search
CPC ................ B64G 1/546; B64G 1/226
See application file for complete search history.

(56) References Cited

U.S. PATENT DOCUMENTS

| | | | | |
|---|---|---|---|---|
| 7,464,901 B2* | 12/2008 | Kinstler | ................ | B64G 1/54 174/353 |
| 10,182,497 B1* | 1/2019 | Wang | .................... | B64G 1/226 |
| 2011/0049303 A1* | 3/2011 | Bamford | ................ | B64G 1/54 244/171.7 |
| 2013/0037656 A1* | 2/2013 | Messano, Jr. | ............. | G21F 7/00 244/171.7 |
| 2014/0070663 A1* | 3/2014 | Diez Garias | ............. | B63G 8/08 310/300 |
| 2017/0121038 A1* | 5/2017 | Dong | ...................... | B64G 1/12 |
| 2020/0361638 A1* | 11/2020 | Tillotson | ................ | B64G 1/226 |

FOREIGN PATENT DOCUMENTS

| | | | | |
|---|---|---|---|---|
| DE | 1639298 B1 * | 10/1970 | ............. | B64G 1/443 |
| GB | 2496013 A * | 5/2013 | ............. | G02B 19/00 |
| GB | 2496022 A * | 5/2013 | ......... | G02B 27/0983 |
| GB | 2496250 A * | 5/2013 | ............... | G21B 1/03 |
| KR | 20140094482 A * | 7/2014 | ............. | B64G 1/226 |
| WO | WO-2007010027 A1 * | 1/2007 | ............. | B64G 1/226 |

OTHER PUBLICATIONS

AIAA'83—AIAA 21st Aerospace Sciences Meeting AIAA-83-0243 Particle Dispersion Around a Spacecraft A.L. Lee, Lockhedd Missiles & Space Co., Inc., Sunnyvale, CA (Year: 1983).*

* cited by examiner

*Primary Examiner* — Behrang Badii
*Assistant Examiner* — Jalal C Coduroglu
(74) *Attorney, Agent, or Firm* — Alleman Hall Creasman & Tuttle LLP (57) ABSTRACT

A spacecraft includes a body defining an interior payload region and a particle dispersion layer disposed between the interior payload region and one or more exterior surfaces of the body. The particle dispersion layer is formed of one or more magnets having a persistent magnetic field. The spacecraft including the particle dispersion layer may be manufactured by obtaining a particle dispersion layer having a persistent magnetic field, identifying a directionality of the persistent magnetic field of the particle dispersion layer, and installing the particle dispersion layer between an interior payload region formed by a body of a spacecraft and one or more exterior surfaces of the body according to the identified directionality of the persistent magnetic field.

20 Claims, 6 Drawing Sheets

PARTICLE DISPERSION LAYER HAVING PERSISTENT MAGNETIC FIELD

FIELD

The invention relates generally to a particle dispersion layer protecting a payload of a spacecraft from external radiation sources.

BACKGROUND

Ionizing radiation produced by high-energy particles may cause a variety of issues in spacecraft electronics. Galactic cosmic rays (GCRs) are an example source of high-energy particles commonly encountered by spacecraft. Single-event effects (SEEs) may occur when a high-energy particle strikes a spacecraft and produces a shower of secondary particles that penetrate the spacecraft. This burst of secondary particles created from the high-energy particle may generate ions of sufficient quantity in a vicinity of an electronic component on-board the spacecraft to cause an SEE. SEEs may result in permanent damage or transient disruption of function of the electronic component. For example, a logic element of an electronic circuit may experience an SEE in the form of upset, latchup, gate rupture, or burnout.

One potential solution aimed at reducing the occurrence of SEEs is the use of mass shielding. This approach places thick and/or dense layers of material between the external radiation environment and an electronic circuit to be protected from SEEs. However, the inventor has recognized that mass shielding by its very nature relies on its mass to provide protection from SEEs, which if used on-board a spacecraft has the potential to significantly increase the total mass of the spacecraft.

Another potential solution aimed at reducing the occurrence of SEEs is the creation of an external magnetic field outside the spacecraft by an electromagnet. This external magnetic field has the potential to deflect at least some charged particles away from the spacecraft. However, the inventor has also recognized several disadvantages of this approach. For example, a magnetic field generator used to produce an external magnetic field can be heavy and consume significant power on-board the spacecraft during operation. Additionally, the inventor has further recognized that the magnetic field produced by the electromagnet may interfere with electronics or instruments on-board the spacecraft. Furthermore, the inventor has recognized that an external magnetic dipole produced by the electromagnet may interact with the magnetic field of another object, such as the magnetic field of Earth or other astronomical object to create torque on the spacecraft, which may negatively impact operation of the spacecraft. Further still, the inventor has also recognized that the external magnetic field generated by the electromagnet may not block or deflect neutral particles like gamma ray photons or charged particles of sufficiently high energy.

Yet another potential solution aimed at reducing the occurrence of SEEs on-board a spacecraft is the use of radiation hardened (rad-hard) electronics. This approach utilizes electronics that are less susceptible to ionizing radiation. The inventor has recognized a number of potential disadvantages of rad-hard electronics, including higher costs and lower performance for the same amount of power, mass, or semiconductor real estate as compared to electronic components not specifically designed to accommodate high-energy radiation environments.

SUMMARY

According to an example of the present disclosure, a spacecraft includes a body defining an interior payload region and a particle dispersion layer disposed between the interior payload region and one or more exterior surfaces of the body. The particle dispersion layer is formed of one or more magnets having a persistent magnetic field.

According to another example of the present disclosure, a method of manufacturing a spacecraft includes obtaining a particle dispersion layer having a persistent magnetic field, identifying a directionality of the persistent magnetic field of the particle dispersion layer, and installing the particle dispersion layer between an interior payload region formed by a body of a spacecraft and one or more exterior surfaces of the body according to the identified directionality of the persistent magnetic field.

According to another example of the present disclosure, a spacecraft includes a body defining an interior payload region, a particle dispersion layer disposed between the interior payload region and one or more exterior surfaces of the body, and a mass shielding layer disposed between the particle dispersion layer and the one or more exterior surfaces of the body. The particle dispersion layer is formed of multiple particle dispersion layer portions, in which each particle dispersion layer portion includes a sheet magnet producing a persistent magnetic field. The persistent magnetic field of each particle dispersion layer portion has a different directionality than each other particle dispersion layer portion along a midplane of the particle dispersion layer.

The features and techniques that have been discussed can be provided independently in various embodiments or may be combined in yet other embodiments, further details of which are described in further detail with reference to the following description and drawings.

DETAILED DESCRIPTION

A particle dispersion layer having a persistent magnetic field is disclosed, which may be used to reduce the likelihood or severity of SEE-based faults created in spacecraft electronics by ionizing radiation. Secondary particles produced by a high energy particle striking the spacecraft may be effectively distributed over a larger region as compared to the use of mass shielding due to the influence of the persistent magnetic field on the secondary particles. This influence by the persistent magnetic field varies with the secondary particle's charge, mass, and speed. For example, secondary particles exhibiting a charge experience a centripetal force within the persistent magnetic field that curves the path of the charged secondary particles, while the path of neutral particles is not curved by the magnetic field from an initial trajectory. Distributing secondary particles over a greater region as compared to mass shielding has the potential to reduce the harmful effects of ionizing radiation on spacecraft components, even if the same total energy is delivered by the secondary particles. The particle dispersion layer may be disposed between an exterior of the spacecraft and a payload to disperse the paths of the secondary particle through the spacecraft and reduce the density of ions created by the secondary particles near sensitive electronic components, thereby reducing the likelihood or severity of SEE.

As discussed briefly above, the inventor has recognized that mass and size limitations of spacecraft may place limits on the use of mass shielding, external magnetic shielding generated by electromagnets, or rad-hard electronics as techniques for reducing SEE risk. The disclosed particle dispersion layer may provide similar or increased dispersion of secondary particles as compared to many of these techniques, but with a lower mass and/or volume of material that is advantageous to spacecraft design and operation. Additionally, the disclosed particle dispersion layer does not rely on electrical power for its operation, as compared to external magnetic fields produced by electromagnets. Furthermore, the particle dispersion layer disclosed herein may be configured to maintain magnetic flux primarily within the particle dispersion layer, thereby reducing or eliminating magnetically-induced torque on the spacecraft or interference with spacecraft components as compared to external magnetic fields generated by electromagnets. The disclosed particle dispersion layer may also enable cheaper or more efficient electronic components to be used on-board a spacecraft as compared to rad-hard electronics.

Figure 1:
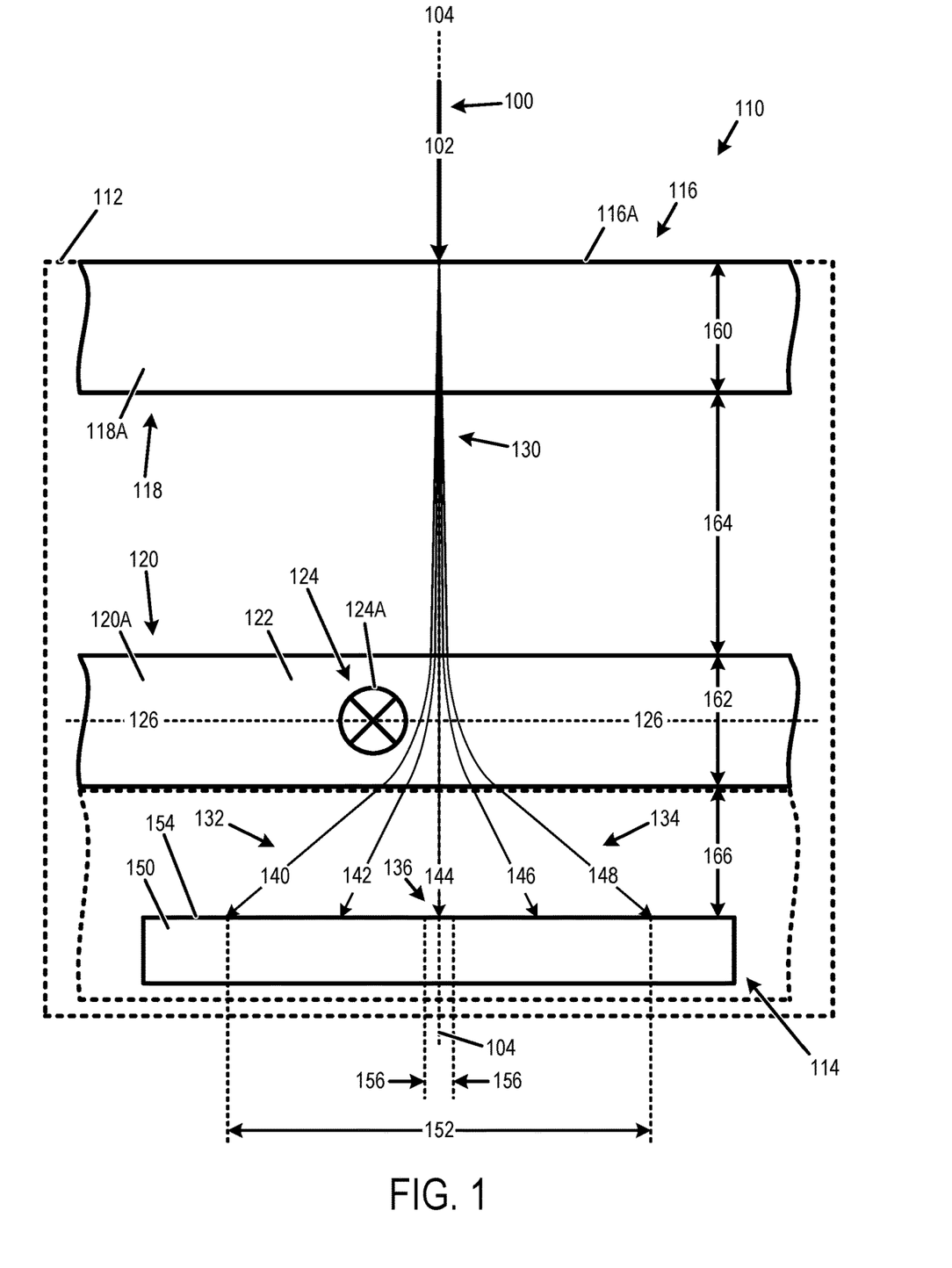
FIG. 1 depicts an example of a particle interacting with a spacecraft that includes a particle dispersion layer having a persistent magnetic field.

FIG. 1 depicts an example interaction of a particle 100 with a spacecraft 110. Spacecraft 110 includes a body 112 defining an interior payload region 114 represented schematically in FIG. 1. Body 112 includes one or more exterior surfaces 116, an example of which includes exterior surface 116A. Spacecraft 110 may further include a mass shielding layer 118, an example of which includes mass shielding layer portion 118A. Mass shielding layer portion 118A is disposed between exterior surface 116A and payload region 114. In at least some examples, exterior surface 116A may form part of mass shielding layer portion 118A. In another example, mass shielding layer 118 may be omitted.

Spacecraft 110 includes a particle dispersion layer 120, an example of which includes particle dispersion layer portion 120A. Particle dispersion layer portion 120A is disposed between payload region 114 and exterior surface 116A of body 112. In examples where mass shielding layer portion 118A is included in spacecraft 110, particle dispersion layer portion 120A may be disposed between payload region 114 and mass shielding layer portion 118A. In at least some examples, particle dispersion layer 120 may additionally provide mass shielding as a primary mass shielding layer of the spacecraft, such as where mass shielding layer 118 is omitted. Some materials suitable for particle dispersion layer 120 may be of sufficient density to serve as a primary mass shielding layer, such as samarium cobalt, neodymium-iron-boron, Alnico, nickel, iron, cobalt-platinum, or ferrites, as examples.

Particle dispersion layer portion 120A is formed of one or more magnets 122 having a persistent magnetic field 124, which is represented schematically in FIG. 1 by example magnetic field vector 124A. As an example, particle dispersion layer 120 has a magnetic flux density within a range of 0.1 Tesla to 2.0 Tesla, and more specifically within a range of 0.4 Tesla to 1.3 Tesla. One or more magnets 122 of particle dispersion layer 120 may include one or more sheet magnets, as an example. Particle dispersion layer portion 120A producing persistent magnetic field 124 may be referred to as a permanent magnet, in contrast to a magnetic field generated by an electromagnet through application of electrical current.

In the example depicted in FIG. 1, magnetic field vector 124A produced by particle dispersion layer portion 120A points orthogonally into the page. Magnetic field vector 124A represents the direction of persistent magnetic field 124 as measured along a midplane 126 of particle dispersion layer portion 120A. By orientating magnetic field vector 124A along particle dispersion layer portion 120A, the persistent magnetic field may be confined to the greatest extent to the particle dispersion layer in contrast to other magnetic shielding approaches that seek to externalize a magnetic field produced by an electromagnet outside of the spacecraft. However, persistent magnetic field 124 may include different directionality from that of magnetic field vector 124A in other examples.

In FIG. 1, a particle 100 traveling along particle path 102 at a velocity "v" relative to spacecraft 110 strikes exterior surface 116A of the spacecraft. Particle path 102 is initially colinear with an incident axis 104. Particle 100 may travel through at least a portion of mass shielding layer portion 118A where the particle may be broken into multiple secondary particles 130. Secondary particles 130 may include one or more positively charged secondary particles, one or more negatively charged secondary particles, and/or one or more secondary particles having a neutral charge. Examples of secondary particles 130 include kaons, protons, and gamma rays, among other forms of secondary particles.

At least some of secondary particles 130 may be dispersed from incident axis 104 by interaction with mass shielding layer portion 118A. Example particle paths 140-148 are depicted in FIG. 1 for secondary particles 130. A path of ions may be formed by secondary particles 130 travelling along particle paths 140-148. A density of the ions produced by secondary particles 130 along a secondary cone formed by particle paths 140-148 may be much greater as compared to particle 100. This increase in ion density from secondary particles 130 increases the likelihood of SEEs.

Secondary particles 130 passing through mass shielding layer portion 118A may continue along their respective trajectories until striking particle dispersion layer portion 120A. At least some of secondary particles 130 may be further dispersed from incident axis 104 and/or from each other by interaction with persistent magnetic field 124 produced by particle dispersion layer portion 120A. Secondary particles 130 passing through particle dispersion layer portion 120A may continue along their respective trajectories until striking a payload 150 located within payload region 114.

Secondary particles 130 striking payload 150 may be distributed over a distance 152 along an external surface 154 of the payload, as measured orthogonally to incident axis 104. FIG. 1 further depicts an example distance 156 over which secondary particles 130 would have otherwise been distributed along external surface 154 in the absence of persistent magnetic field 124 produced by particle dispersion layer portion 120A. Thus, the presence of persistent magnetic field 124 may increase a distance over which secondary particles 130 are distributed with respect to payload 150.

Persistent magnetic field 124 produced by particle dispersion layer portion 120A exerts a magnetic force on secondary particles 130 in the form of a centripetal force "Fc". This centripetal force "Fc" on an individual secondary particle traveling through magnetic field 124 at a relative velocity "$v_{rel}$" to the magnetic field may be represented by the following equation: Fc=(q) $v_{rel}$×B, where "q" represents a charge of the secondary particle, "B" represents the magnetic field vector 124A, and "x" represents the cross product of the relative velocity "$v_{rel}$" and the magnetic field vector "B".

In view of the above relationship between charge "q", relative velocity "$v_{rel}$" of the secondary particle in relation to the magnetic field, and magnetic field vector "B", the centripetal force "Fc" on an individual secondary particle varies in direction based on a charge of the secondary particle. According to application of the right-hand rule, negatively charged secondary particles 132 of secondary particles 130 are deflected along a curved path in a first direction (toward the left-hand side of FIG. 1) by magnetic field vector 124A pointing into the page. Example particle paths 140 and 142 of negatively charged secondary particles 132 are depicted in FIG. 1. Positively charged secondary particles 134 of secondary particles 130 are deflected along a curved path in a second direction (toward the right-hand side of FIG. 1) by magnetic field vector 124A pointing into the page. Example particle paths 146 and 148 of positively charged secondary particles 134 are depicted in FIG. 1. Neutral secondary particle 136 of secondary particles 130 is not deflected by magnetic field vector 124A, as depicted by example particle path 144.

Ions of secondary particles 130 follow a curved trajectory in the presence of persistent magnetic field 124 that has a radius referred to as the gyroradius. The gyroradius "R" of a secondary particle may be represented by the following equation: R=($m_{ion}$*$v_{rel}$)/(q*B), where "$m_{ion}$" is the mass of the secondary particle (including relativistic effects). For example, for a 1 Giga electron-volt (GeV) kaon, which is a typical secondary particle from a GCR impact, mass "$m_{ion}$" is given by: $m_{ion}$=493.7 MeV rest mass+1 GeV kinetic energy=1.494 GeV×1.783×$10^{-27}$ kg/GeV=2.66×$10^{-27}$ kg. Continuing with this example, charge "q" is 1.6×$10^{-19}$ Coulomb (C), and relative velocity is approximately 0.9 c=2.7×$10^8$ m/sec, where "c" is the speed of light. If the magnetic field intensity is 0.1 Tesla (T), the gyroradius R is given by: R=(2.66×$10^{-27}$ kg×2.7×$10^8$ m/sec)/(1.6×$10^{-19}$ C×0.1 T)=44.9 meters.

If, for example, the kaon is in the magnetic field for a distance of only 1.0 millimeter, its path is bent by $10^{-3}$ m/45 m=22.3 microradians. Assuming that two kaons are produced in an impact, one being positive, the other being negative, each traveling with 1.0 GeV of kinetic energy, and each kaon strikes an electronic circuit one centimeter beyond the magnetic particle dispersion layer, the path of each kaon will have deflected by $10^{-2}$ m×22.3×$10^{-6}$ rad=223×$10^{-9}$ m (223 nm). Since the kaons have opposite charge, they deflect in opposite directions, so their separation when they reach the circuit is 2×223 nm=446 nm. This deflection may be sufficient to avoid a double strike by the kaons on an electronic gate or other electronic component.

FIG. 1 further depicts example dimensions as measured along incident axis 104. Mass shielding layer portion 118A has a thickness 160 as measured along incident axis 104. Thickness 160 of mass shielding layer 118 may be selected based on expected operating conditions of the spacecraft, but may be limited by weight and size limitations. In the example depicted in FIG. 1, midplane 126 of particle dispersion layer portion 120A overlaying payload 150 is parallel to external surface 154 of the payload. Particle dispersion layer portion 120A has a thickness 162 as measured along incident axis 104. In an example, thickness 162 of particle dispersion layer 120 may be at least 0.3 millimeters and less than 2 centimeters. However, other suitable range for thickness 162 may be used depending on implementation.

In the example depicted in FIG. 1, mass shielding layer portion 118A is spaced apart from particle dispersion layer portion 120A by a distance 164. In another example, mass shielding layer portion 118A adjoins particle dispersion layer portion 120A. Furthermore, in the example depicted in FIG. 1, particle dispersion layer portion 120A is spaced apart from payload 150 by a distance 166. Particle dispersion layer 120 may be separated from the payload by a free space on some or all sides of the payload. As an example, distance 166 may be 1.0 centimeter to increase a distribution of secondary particles 130 across distance 152 by approximately 446.0 nanometers, assuming based on the above example that secondary particles 130 have a kinetic energy of 1.0 GeV and the particle dispersion layer has a magnetic field of 0.1 Tesla. As another example, distance 166 may be scaled down to 1.0 millimeter to provide an increase in the distribution of secondary particles 130 across distance 152 of approximately 44.6 nanometers, which is sufficient to reduce SEE risk to logic gates having a size of approximately 14.0 nanometers. In another example, particle dispersion layer portion 120A may adjoin payload 150, such as where components sensitive to SEEs are located within an interior volume of payload 150.

Figure 2:
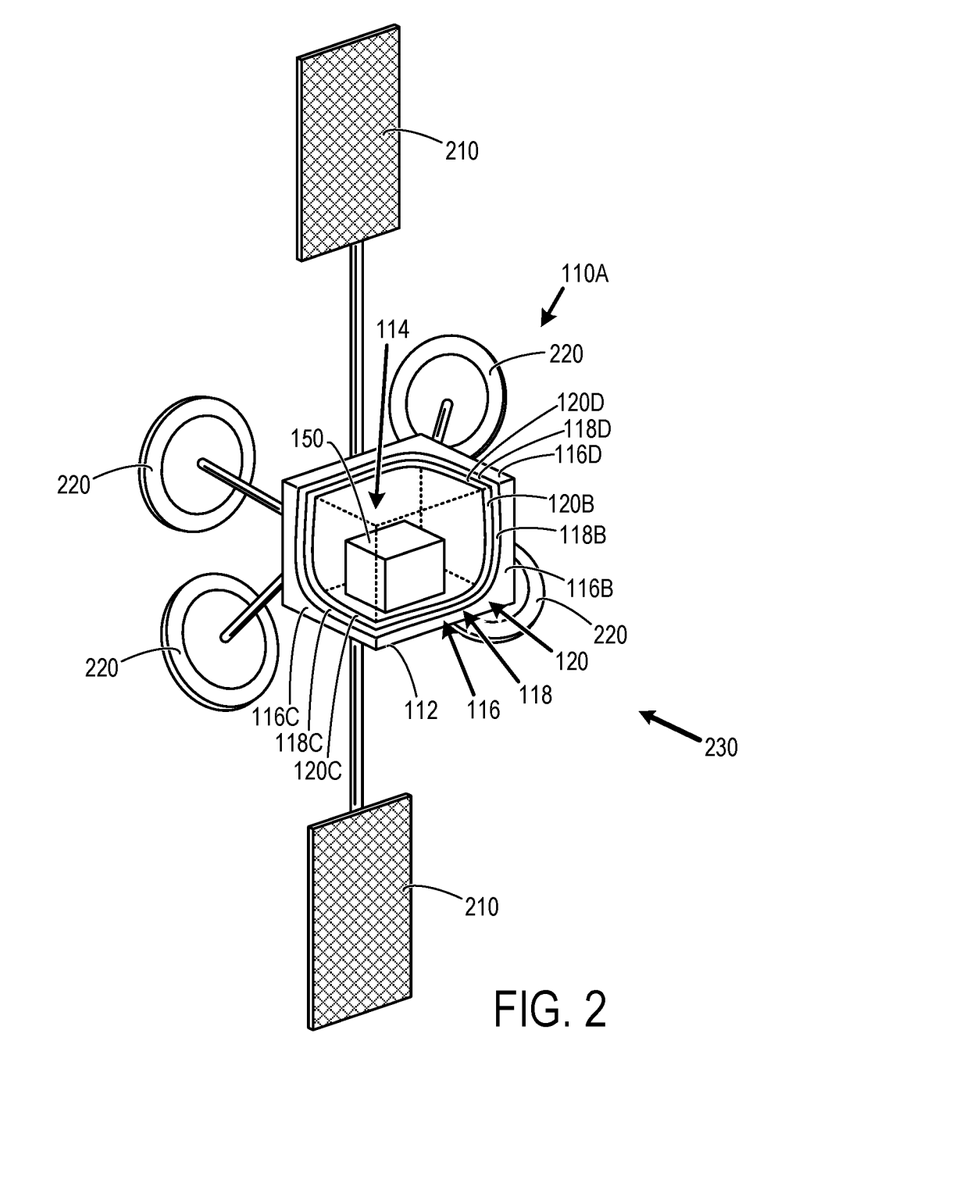
FIG. 2 depicts an example spacecraft that includes a particle dispersion layer having a persistent magnetic field.

FIG. 2 depicts an example spacecraft 110A in the form of a communications satellite. Spacecraft 110A is one example of previously described spacecraft 110 of FIG. 1. Spacecraft 110 of FIG. 1 may take other forms, including a space vehicle transporting human passengers or other payloads, a sensor-based probe, or other space-based platform.

As previously described with reference to FIG. 1, spacecraft 110A includes body 112 defining interior payload region 114 represented schematically in FIG. 1. Body 112 includes exterior surfaces 116, examples of which include exterior surfaces 116B, 116C, 116D, etc., surrounding payload region 114. Payload 150 represented schematically in FIG. 2 is located within a volume formed by payload region 114. Additional components may be mounted to body 112, including solar panels 210 and communications antennas 220, as an example.

Spacecraft 110A further includes mass shielding layer 118, examples of which include mass shielding layer portions 118B, 118C, 118D, etc. Mass shielding layer portions 118B, 118C, and 118D are disposed between payload region 114 and exterior surfaces 116B, 116C, and 116D, respectively. In this example, mass shielding layer 118 completely surrounds payload region 114. However, in another example, mass shielding layer 118 may be provided on only some of the sides of the spacecraft. For example, in FIG. 2, solar panels 210 may be oriented towards a source of solar radiation 230 to gather energy, and mass shielding layer 118 may be provided on one or more sides of the spacecraft that are configured to face towards the source of solar radiation, such as example mass shielding layer 118B. By contrast, communications antennas 220 may be orientated away from the source of solar radiation and towards a target object (e.g., Earth), and one or more sides of the spacecraft that are configured to face away from the source of solar radiation may omit the mass shielding layer.

Spacecraft 110A further includes particle dispersion layer 120, examples of which include particle dispersion layer portions 120B, 120C, 120D, etc. Particle dispersion layer 120 is formed of one or more magnets having a persistent magnetic field, as previously described with reference to FIG. 1. Particle dispersion layer portions 120B, 120C, and 120D are disposed between payload region 114 and exterior surfaces 116B, 116C, and 116D, respectively. Particle dispersion layer 120 may span at least a portion of a three-dimensional projection of the volume formed by interior payload region 114 toward an outward-facing side of the one or more exterior surfaces 116 of body 112. In this example, particle dispersion layer 120 forms a continuous layer that completely surrounds payload region 114. However, in another example, particle dispersion layer 120 may be provided on only some of the sides of the spacecraft and may partially surround the interior payload region in three-dimensions, such as depicted with respect to particle dispersion layer portions 120B, 120C, and 120D. For example, particle dispersion layer 120 may be provided on one or more sides of the spacecraft that are configured to face towards a source of solar radiation, such as example particle dispersion layer portion 120B, and one or more sides of the spacecraft that are configured to face away from the source of solar radiation may omit the particle dispersion layer. In the example depicted in FIG. 2, particle dispersion layer 120 adjoins mass shielding layer 118 to form a combined mass shielding/magnetic shielding wall structure.

Figure 3:
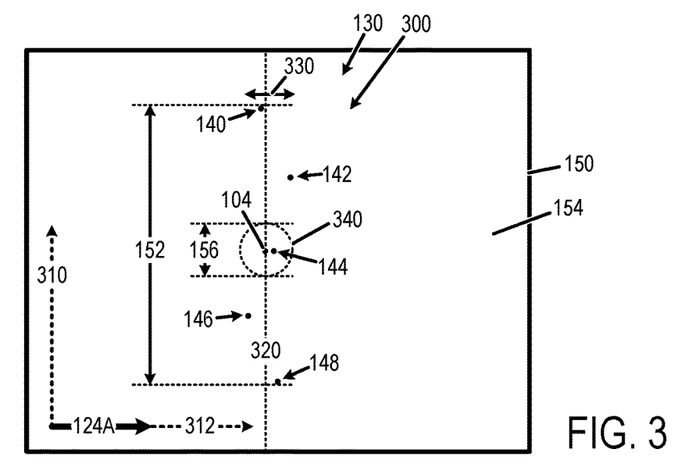
FIG. 3 depicts an example distribution of secondary particles striking a payload.

FIG. 3 depicts an example distribution 300 of secondary particles 130 striking surface 154 of payload 150 in relation to incident axis 104. Surface 154 of payload 150 is depicted in a plan view in FIG. 3 as viewed along incident axis 104 in a direction of travel of particle 100 of FIG. 1. Distribution 300 of secondary particles 130 is represented in FIG. 3 by an intersection of particle paths 140-148 with surface 154.

A coordinate system defined in relation to payload 150 is also depicted in FIG. 3, including a first axis 310 and a second axis 312 that is orthogonal to the first axis. In this example, incident axis 104 is orthogonal to both first axis 310 and second axis 312. An example orientation of magnetic field vector 124A of persistent magnetic field 124 produced by particle dispersion layer portion 120A of FIG. 1 is depicted in FIG. 3 in relation to first axis 310 and second axis 312. In this example, magnetic field vector 124A is orthogonal to first axis 310 and is parallel to second axis 312. An axis that is orthogonal to magnetic field vector 124A may be referred to as a primary dispersion axis 320 over which secondary particles 130 are distributed. In the example depicted in FIG. 3, primary dispersion axis 320 is parallel to first axis 310.

Secondary particles 130 are distributed over distance 152 in a first dimension as measured along first axis 310 due to interaction with magnetic field vector 124A. Secondary particles 130 may also be dispersed from incident axis 104 in a second dimension as measured along second axis 312 due to interaction with mass shielding layer 118 and/or particle dispersion layer 120. In this example, secondary particles 130 are distributed over a distance 330 as measured along second axis 312. Secondary particles 130 are distributed over a greater distance measured along primary dispersion axis 320 as represented by distance 152 than distance 330 measured along second axis 312 due to the influence of magnetic field vector 124A.

FIG. 3 further depicts an example region 340 within which secondary particles 130 would have otherwise been distributed in the absence of persistent magnetic field 124 having magnetic field vector 124A. Distance 156 is depicted in FIG. 3 corresponding to a width of region 340 along first axis 310. Distance 156 in the absence of magnetic interaction is again depicted as being less than distance 152 in the presence of magnetic interaction with particle dispersion layer 120. Distance 330 also corresponds to a width of region 340, since dispersion of secondary particles 130 due to interaction with magnetic field vector 124A is along primary dispersion axis 320 that is orthogonal to the magnetic field vector.

Figure 4:
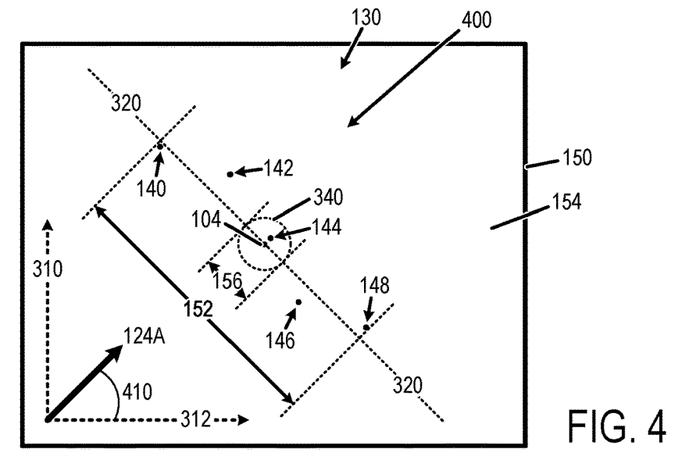
FIG. 4 depicts another example distribution of secondary particles striking a payload.

By changing a relative orientation between magnetic field vector 124A and payload 150, an orientation of primary dispersion axis 320 may be likewise changed. FIG. 4 depicts an example distribution 400 of secondary particles 130 striking surface 154 of payload 150 in relation to incident axis 104. In contrast to the example distribution 300 of FIG. 3, magnetic field vector 124A is orientated at an angle 410 measured relative to second axis 312. Angle 410 in this example corresponds to an angle of 45 degrees in relation to second axis 312. Primary dispersion axis 320, which is defined as being orthogonal to magnetic field vector 124A is orientated at an angle of 45 degrees relative to first axis 310, in contrast to the example of FIG. 3.

A payload, such as example payload 150, may include one or more regions within which components of the payload are more sensitive to secondary particles 130 distributed along one primary dispersion axis than along another. For example, an electronic circuit may include at least one conductive channel and may have a shape of a rectangle that is many times longer along first axis 310 than along second axis 312, which is a common configuration used in electronic circuit design. By way of example, a first and second dimension may be the length and width of a printed circuit board (PCB), a length and width of a microprocessor, other integrated circuit, or other electronic component mounted to such a PCB, etc. Electronic circuit designs commonly include many conductive channels that are aligned with either the first dimension or the second dimension, like lines in a rectangular grid. By reducing alignment of a primary dispersion axis with first axis 310 and with second axis 312, the number of secondary particles striking close to a conductive channel from a single primary particle may be reduced. Within the context of electronic circuits, this configuration has the potential to reduce incidents of SEEs.

Figure 5:
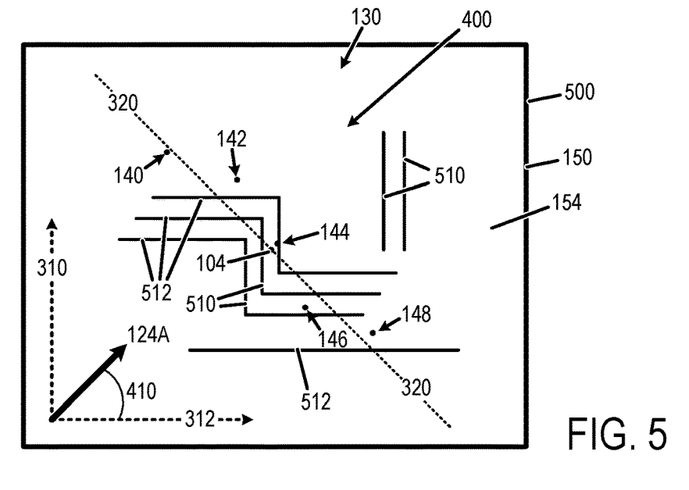
FIG. 5 depicts the example distribution of secondary particles of FIG. 4 in relation to an electronic circuit.

FIG. 5 depicts the example distribution 400 of secondary particles 130 of FIG. 4 in relation to an electronic circuit 500. Electronic circuit 500 is one example of payload 150. In this example electronic circuit 500 includes conductive channels represented schematically at 510 and 512 in FIG. 5. Conductive channels 510 are orientated parallel to first axis 310, and conductive channels 512 are orientated parallel to second axis 312.

A region of an electronic circuit may be defined as having a grid orientation such that a majority of the conductive channels within the region of the electronic circuit is either parallel to or perpendicular to the grid orientation. For example, within FIG. 5, a grid orientation of conductive channels may be parallel to first axis 310 because a majority of conductive channels 510 and 512 are parallel to or perpendicular to first axis 310. A grid orientation has four-fold rotational symmetry, i.e., a grid orientation of 0° is equivalent to 90°, 180°, and 270°. Thus, a grid orientation parallel to first axis 310 also has a grid orientation parallel to second axis 312.

In this example, magnetic field vector 124A is again angled relative to first axis 310 and second axis 312, as previously described with reference to FIG. 4. Accordingly, magnetic field vector 124A residing within a midplane of particle dispersion layer 120 overlaying the region of electronic circuit 500 depicted in FIG. 5 is orientated at an angle relative to the primary grid orientation corresponding to first axis 310 and second axis 312. Further, in this example, both magnetic field vector 124A and primary dispersion axis 320 are therefore angled relative to conductive channels 510 and 512. Angle 410 is depicted in relation to second axis 312, which is parallel to the grid orientation in this example. Angle 410 may, for example, be 20-70 degrees relative to the grid orientation. For example, angle 410 may be 45 degrees relative to the grid orientation to provide an equal angular misalignment between first axis 310 and second axis 312 of the grid orientation. By reducing alignment of magnetic field vector 124A with conductive channels 510 and 512, clustering of secondary particles 130 along conductive channels 510 and 512 in a dimension that is parallel to magnetic field vector 124A is reduced.

Figure 6:
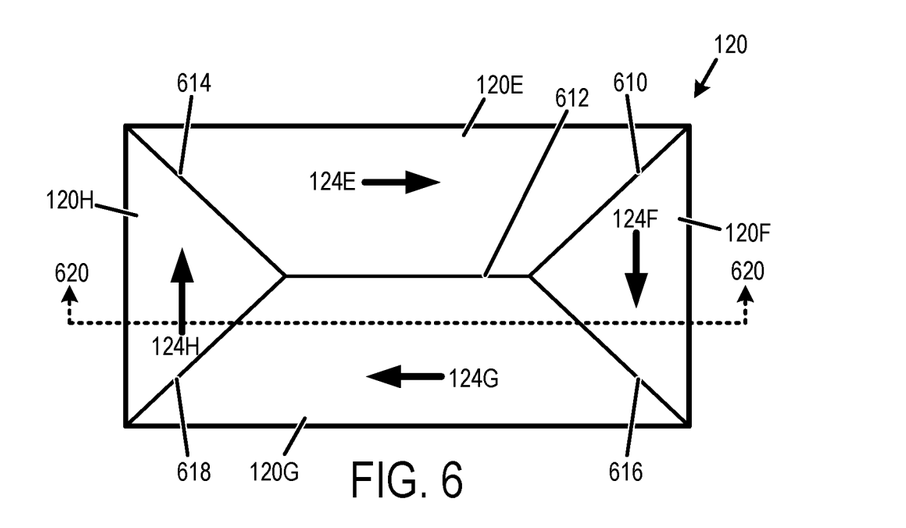
FIG. 6 depicts an example particle dispersion layer in a plan view including multiple portions having persistent magnetic fields of different orientations.
Figure 7:
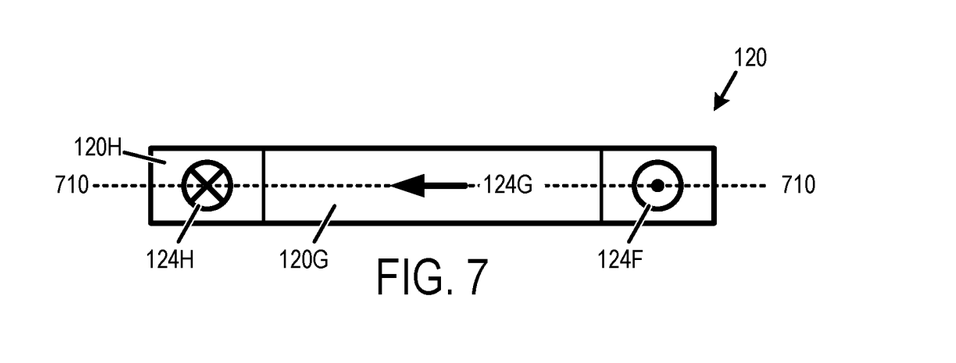
FIG. 7 depicts the example particle dispersion layer of FIG. 6 in a section view.

FIG. 6 depicts another example of particle dispersion layer 120 in a plan view. In this example, particle dispersion layer 120 includes multiple particle dispersion layer portions 120E, 120F, 120G, and 120H that collectively form a continuous particle dispersion layer. FIG. 7 depicts particle dispersion layer of FIG. 6 in a section view through section 620.

Particle dispersion layer portions 120E, 120F, 120G, and 120H each produce a persistent magnetic field having a different directionality as represented by magnetic field vectors 124E, 124F, 124G, and 124H, respectively. Magnetic field vectors 124E, 124F, 124G, and 124H each represent a respective directionality of the persistent magnetic field produced by particle dispersion layer portions 120E, 120F, 120G, and 120H at a midplane 710 of particle dispersion layer 120, such as previously described with reference to midplane 126 of FIG. 1.

Magnetic field vectors 124E, 124F, 124G, and 124H are angled relative to each other (e.g., 90 degrees) in a step-wise manner moving along particle dispersion layer portions 120E, 120F, 120G, and 120H in a clock-wise direction. Collectively, magnetic field vectors 124E, 124F, 124G, and 124H angled relative to each other in a step-wise manner to create a closed loop may increase confinement of the persistent magnetic fields to within particle dispersion layer 120. This configuration has the potential to reduce magnetic interference with other components located on-board a spacecraft.

In this example, portion 120E interfaces with portions 120F, 120G, and 120H along boundaries 610, 612, and 614, respectively. Portion 120F interfaces with portions 120E and 120G along boundaries 610 and 616, respectively. Portion 120G interfaces with portions 120E, 120F, and 120G along boundaries 612, 616, and 618, respectively. Portion 120H interfaces with portions 120E and 120G along boundaries 614 and 618, respectively. Furthermore, in this example, boundaries 610, 614, 616, and 618 are each angled (e.g., 45 degrees) relative to boundary 612. Portions 120E, 120F, 120G, and 120H may originate from a common particle dispersion layer material having a common directionality of a persistent magnetic field. As an example, portions 120E, 120F, 120G, and 120H may be cut from the particle dispersion layer material (e.g., a sheet magnet) to a target size and shape based on the directionality of the persistent magnetic field to obtain multiple portions having their respective magnetic field orientations. For example, particle dispersion layer 120 may be formed from multiple sheet magnets corresponding to particle dispersion layer portions 120E, 120F, 120G, and 120H distributed across the particle dispersion layer. Two or more sheet magnets of the multiple sheet magnets corresponding to particle dispersion layer portions 120E, 120F, 120G, and 120H each have a magnetic field vector along midplane 710 of particle dispersion layer 120 that is angled relative to each of the other two or more sheet magnets.

Figure 8:
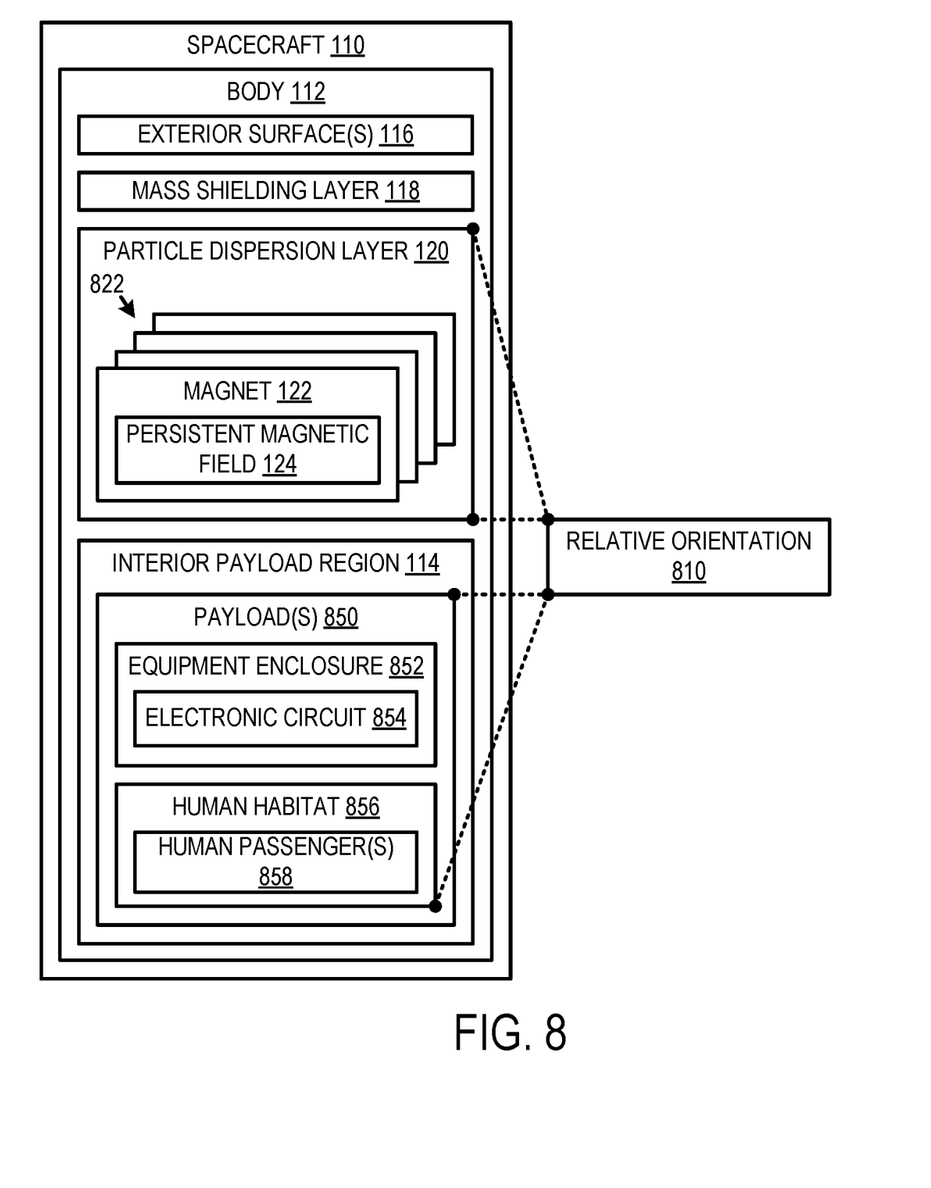
FIG. 8 schematically depicts additional aspects of the spacecraft of FIG. 1 in further detail.

FIG. 8 schematically depicts additional aspects of spacecraft 110 of FIG. 1 in further detail. Spacecraft 110 includes body 112 defining interior payload region 114. Spacecraft 110 includes particle dispersion layer 120 formed of a set of one or more magnets 822 having a persistent magnetic field. For example, the set of magnets 822 may include previously described magnets 122 of FIG. 1, which produces persistent magnetic field 124 having previously described magnetic field vector 124A.

Particle dispersion layer 120 is disposed between payload region 114 and one or more exterior surfaces 116 of body 112. In an example, particle dispersion layer 120 may be mounted to or integrated with body 112. Spacecraft 110 may include mass shielding layer 118 disposed between particle dispersion layer 120 and the one or more exterior surfaces 116 of body 112. However, mass shielding layer 118 may be omitted in at least some examples.

Example payloads 850 are located within payload region 114 in FIG. 8, including an equipment enclosure 852 containing an electronic circuit 854, and a human habitat 856 containing one or more human passengers 858. Payloads 850 are examples of previously described payload 150 of FIG. 1. Particle dispersion layer 120 produces persistent magnetic field 124 having a relative orientation 810 with respect to payloads 850. As previously described with reference to FIGS. 3-5, relative orientation 810 may be selected, for example, to reduce alignment of a magnetic field vector produced by particle dispersion layer 120 with a primary orientation of sensitive components of payloads 850, thereby reducing the density of secondary particle strikes along the sensitive components.

Figure 9:
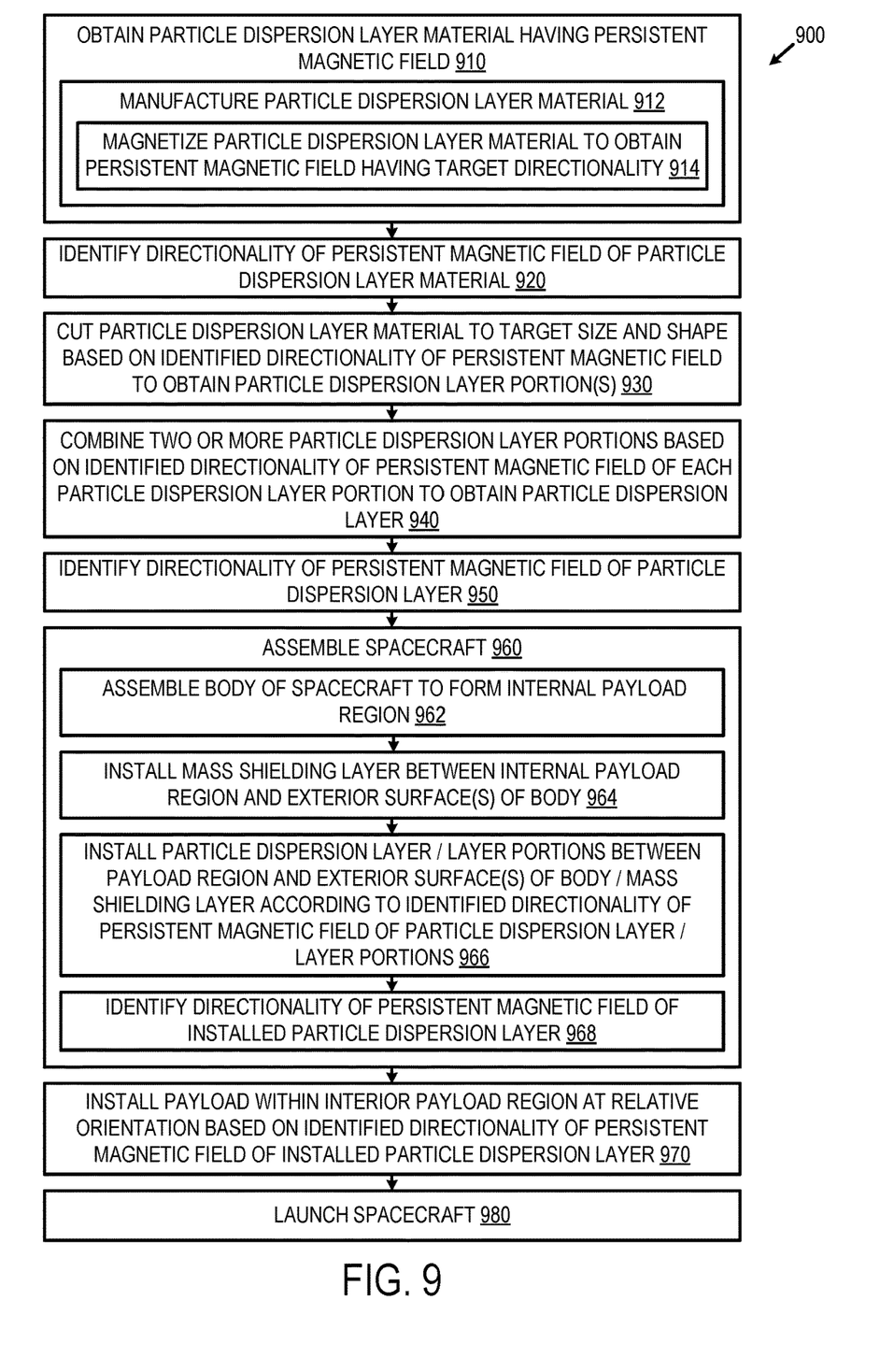
FIG. 9 depicts a flow diagram of example operations that may be performed with respect to manufacturing a spacecraft including a particle dispersion layer having a persistent magnetic field.

FIG. 9 depicts a flow diagram of example operations 900 that may be performed with respect to manufacturing a spacecraft including a particle dispersion layer having a persistent magnetic field. Some or all of operations 900 may be performed as part of a method of manufacturing the spacecraft. The spacecraft manufactured by one or more of operations 900 may include any of the previously described spacecraft configurations disclosed herein, including spacecraft 110 of FIG. 1, for example.

A particle dispersion layer material having a persistent magnetic field is obtained at 910. Obtaining the particle dispersion layer material at 910 may include manufacturing the particle dispersion layer material at 912. As part of manufacturing the particle dispersion layer material, the particle dispersion layer material may be magnetized at 914 to obtain a persistent magnetic field having a target directionality. As an example, a sheet of the particle dispersion layer material may be magnetized so that the persistent magnetic field has a target directionality that is within a plane of the sheet, such as previously described with reference to magnetic field vector 124A orientated along midplane 126 of FIG. 1. The particle dispersion layer material may be magnetized by applying a magnetic field to the particle dispersion layer, such via operation of an electromagnet. Examples of particle dispersion layer materials that may be suitable for magnetization include ferromagnetic materials that maintain a persistent magnetic field responsive to an applied magnetic field.

At 920, a directionality of a persistent magnetic field of the particle dispersion layer material is identified. Operation 920 may be performed to confirm that the directionality of the persistent magnetic field of the particle dispersion layer material is within a threshold range of the target directionality. In an example, the magnetic field produced by the particle dispersion layer material may be measured using a multi-axis magnetic field sensor, enabling the directionality and/or strength of the magnetic field to be measured in two or three dimensions.

At 930, the particle dispersion layer material may be cut to a target size and shape based on the identified directionality of the persistent magnetic field to obtain one or more particle dispersion layer portions. Each particle dispersion layer portion obtained by operation 930 may have a target directionality of the persistent magnetic field in relation to the shape of that portion. FIG. 2 depicts an example of particle dispersion layer portions at 120B, 120C, and 120D that may be produced by operation 930. FIGS. 6 and 7 depict another example of particle dispersion layer portions at 120E, 120F, 120G, and 12011 that may be produced by operation 930.

At 940, two or more particle dispersion layer portions may be combined based on the directionality of the persistent magnetic field identified for each portion to obtain a particle dispersion layer. For example, as previously described with reference to FIGS. 6 and 7, multiple particle dispersion layer portions may be combined to provide a step-wise change in directionality among magnetic field vectors throughout the particle dispersion layer. Operation 940 may be omitted in some examples, such as where the particle dispersion layer is formed of an individual particle dispersion layer portion.

At 950, a directionality of the persistent magnetic field of the particle dispersion layer may be identified. Operation 950 may be performed to confirm that the directionality of the persistent magnetic field of the particle dispersion layer is within a threshold range of a target directionality. The magnetic field produced by the particle dispersion layer may be measured, for example, using a multi-axis magnetic field sensor, enabling the directionality and/or strength of the magnetic field to be measured in two or three dimensions.

The spacecraft may be assembled at 960, which may include one or more of operations 962-968. At 962, a body of the spacecraft is assembled to form an interior payload region. At 964, a mass shielding layer may be installed between the payload region and one or more exterior surfaces of the body. Operation 964 may be omitted where a mass shielding layer is not included in the spacecraft. At 966, the particle dispersion layer obtained at operation 940 or the particle dispersion layer portions obtained at operation 930 are installed between the payload region and the one or more exterior surfaces of the body to obtain an installed particle dispersion layer. In examples where a mass shielding layer is included in the spacecraft, the particle dispersion layer obtained at operation 940 or the particle dispersion layer portions obtained at operation 930 may be installed between the payload region and the mass shielding layer.

At 968, a directionality of a persistent magnetic field of the installed particle dispersion layer may be identified. Operation 968 may be performed to confirm that the directionality of the persistent magnetic field of the installed particle dispersion layer is within a threshold range of a target directionality, particularly with respect to an intended orientation of payload components to be installed within the spacecraft. The magnetic field produced by the particle dispersion layer may be measured, for example, using a multi-axis magnetic field sensor, enabling the directionality and/or strength of the magnetic field to be measured in two or three dimensions. In some examples, magnetization of the particle dispersion layer material previously described at operation 914 may be performed following installation at operation 966. For example, operation 960 may additionally include magnetizing the particle dispersion layer installed in the spacecraft to obtain the persistent magnetic field having a target directionality.

At 970, a payload is installed within the payload region at a relative orientation that is based on the identified directionality of the persistent magnetic field of the installed particle dispersion layer. At 980, the spacecraft may be launched carrying the payload.

Examples of the subject matter of the present disclosure are described in the following enumerated paragraphs.

A1. A spacecraft, comprising: a body defining an interior payload region; and a particle dispersion layer formed of one or more magnets having a persistent magnetic field, the particle dispersion layer disposed between the interior payload region and one or more exterior surfaces of the body.

A2. The spacecraft of paragraph A1, wherein the interior payload region forms a volume; and wherein the particle dispersion layer spans at least a portion of a three-dimensional projection of the volume toward an outward-facing side of the one or more exterior surfaces of the body.

A3. The spacecraft of any of paragraphs A1-A3, wherein the particle dispersion layer forms a continuous layer that at least partially surrounds the interior payload region in three-dimensions.

A4. The spacecraft of any of paragraphs A1-A3, further comprising: the payload located within the interior payload region; and wherein the particle dispersion layer is mounted to or integrated with the body.

A5. The spacecraft of paragraph A4, wherein the particle dispersion layer is separated from the payload by a free space that has a thickness of at least 1 millimeter as measured between the payload and the particle dispersion layer.

A6. The spacecraft of paragraph A4, wherein the payload includes an electronic circuit.

A7. The spacecraft of paragraph A6, wherein a region of the electronic circuit has a grid orientation of electronic components defined by an orientation of a majority of the electronic components within the region of the electronic circuit; and wherein a magnetic field vector of the particle dispersion layer within a midplane of the particle dispersion layer overlaying the region of the electronic circuit is orientated at an angle relative to the grid orientation.

A8. The spacecraft of paragraph A4, wherein the interior payload region includes a human habitat.

A9. The spacecraft of any of paragraphs A1-A8, wherein the particle dispersion layer additionally provides mass shielding as a primary mass shielding layer of the spacecraft; and wherein the particle dispersion layer has a thickness of at least 0.3 millimeters and less than 2 centimeters.

A10. The spacecraft of any of paragraphs A1-A9, further comprising: a mass shielding layer disposed between the particle dispersion layer and the one or more exterior surfaces of the body.

A11. The spacecraft of any of paragraphs A1-A10, wherein the particle dispersion layer has a magnetic field vector residing within the particle dispersion layer along a midplane of the particle dispersion layer.

A12. The spacecraft of any of paragraphs A1-A11, wherein the one or more magnets include multiple sheet magnets; wherein the particle dispersion layer is formed from the multiple sheet magnets distributed across the particle dispersion layer; and wherein two or more sheet magnets of the multiple sheet magnets each have a magnetic field vector along a midplane of the particle dispersion layer that is angled within the midplane relative to each of the other two or more sheet magnets.

A13. The spacecraft of any of paragraphs A1-A12, wherein the particle dispersion layer has a magnetic flux density within a range of 0.4 Tesla to 1.3 Tesla.

B1. A method of manufacturing a spacecraft, the method comprising: obtaining a particle dispersion layer having a persistent magnetic field; identifying a directionality of the persistent magnetic field of the particle dispersion layer; and installing the particle dispersion layer between an interior payload region formed by a body of a spacecraft and one or more exterior surfaces of the body according to the identified directionality of the persistent magnetic field.

B2. The method of paragraph B1, further comprising: installing a payload within the interior payload region at a relative orientation to the particle dispersion layer that is based on the identified directionality of the persistent magnetic field installed within the spacecraft.

B3. The method of any of paragraphs B1-B2, further comprising: obtaining a particle dispersion layer material having the persistent magnetic field; identifying a directionality of the persistent magnetic field of the particle dispersion layer material; and cutting the particle dispersion layer material to a target size and shape based on the identified directionality of the persistent magnetic field material to obtain the particle dispersion layer.

B4. The method of paragraph B3, further comprising: magnetizing the particle dispersion layer material to obtain the persistent magnetic field having a target directionality prior to cutting the particle dispersion layer material.

B5. The method of any of paragraphs B1-B2, wherein the identified directionality of the persistent magnetic field includes a target directionality; and wherein the method further comprises magnetizing the particle dispersion layer installed in the spacecraft to obtain the persistent magnetic field having the target directionality.

C1. A spacecraft, comprising: a body defining an interior payload region; a particle dispersion layer disposed between the interior payload region and one or more exterior surfaces of the body, the particle dispersion layer formed of multiple particle dispersion layer portions, each particle dispersion layer portion including a sheet magnet producing a persistent magnetic field, the persistent magnetic field of each particle dispersion layer portion having a different directionality than each other particle dispersion layer portion along a midplane of the particle dispersion layer; and a mass shielding layer disposed between the particle dispersion layer and the one or more exterior surfaces of the body.

C2. The spacecraft of paragraph C1, wherein the particle dispersion layer forms a continuous layer that spans a three-dimensional projection of a volume of the payload region toward an outward-facing side of the one or more exterior surfaces of the body.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples, and may find utility in other implementations not expressly disclosed herein.

The invention claimed is:

1. A spacecraft, comprising:
a body defining an interior payload region; and
a particle dispersion layer formed of one or more magnets having a persistent magnetic field, the particle dispersion layer disposed between the interior payload region and one or more exterior surfaces of the body.

2. The spacecraft of claim 1, wherein the interior payload region forms a volume; and
wherein the particle dispersion layer spans at least a portion of a three-dimensional projection of the volume toward an outward-facing side of the one or more exterior surfaces of the body.

3. The spacecraft of claim 1, wherein the particle dispersion layer forms a continuous layer that at least partially surrounds the interior payload region in three-dimensions.

4. The spacecraft of claim 1, further comprising:
a payload located within the interior payload region; and
wherein the particle dispersion layer is mounted to or integrated with the body.

5. The spacecraft of claim 4, wherein the particle dispersion layer is separated from the payload by a free space that has a thickness of at least 1 millimeter as measured between the payload and the particle dispersion layer.

6. The spacecraft of claim 4, wherein the payload includes an electronic circuit.

7. The spacecraft of claim 6, wherein a region of the electronic circuit has a grid orientation of electronic components defined by an orientation of a majority of the electronic components within the region of the electronic circuit; and
wherein a magnetic field vector of the particle dispersion layer within a midplane of the particle dispersion layer overlaying the region of the electronic circuit is orientated at an angle relative to the grid orientation.

8. The spacecraft of claim 4, wherein the interior payload region includes a human habitat.

9. The spacecraft of claim 1, wherein the particle dispersion layer additionally provides mass shielding as a primary mass shielding layer of the spacecraft; and
wherein the particle dispersion layer has a thickness of at least 0.3 millimeters and less than 2 centimeters.

10. The spacecraft of claim 1, further comprising:
a mass shielding layer disposed between the particle dispersion layer and the one or more exterior surfaces of the body.

11. The spacecraft of claim 1, wherein the particle dispersion layer has a magnetic field vector residing within the particle dispersion layer along a midplane of the particle dispersion layer.

12. The spacecraft of claim 1, wherein the one or more magnets include multiple sheet magnets;
wherein the particle dispersion layer is formed from the multiple sheet magnets distributed across the particle dispersion layer; and
wherein two or more sheet magnets of the multiple sheet magnets each have a magnetic field vector along a midplane of the particle dispersion layer that is angled within the midplane relative to each of the two or more sheet magnets.

13. The spacecraft of claim 1, wherein the particle dispersion layer has a magnetic flux density within a range of 0.4 Tesla to 1.3 Tesla.

14. A method of manufacturing a spacecraft, the method comprising:
- obtaining a particle dispersion layer having a persistent magnetic field;
- identifying a directionality of the persistent magnetic field of the particle dispersion layer; and
- installing the particle dispersion layer between an interior payload region formed by a body of the spacecraft and one or more exterior surfaces of the body according to the identified directionality of the persistent magnetic field.

15. The method of claim 14, further comprising:
- installing a payload within the interior payload region at a relative orientation to the particle dispersion layer that is based on the identified directionality of the persistent magnetic field installed within the spacecraft.

16. The method of claim 14, further comprising:
- obtaining a particle dispersion layer material having the persistent magnetic field;
- identifying a directionality of the persistent magnetic field of the particle dispersion layer material; and
- cutting the particle dispersion layer material to a target size and shape based on the identified directionality of the persistent magnetic field of the persistent magnetic layer material to obtain the particle dispersion layer.

17. The method of claim 16, further comprising:
- magnetizing the particle dispersion layer material to obtain the persistent magnetic field having a target directionality prior to cutting the particle dispersion layer material.

18. The method of claim 14, wherein the identified directionality of the persistent magnetic field includes a target directionality; and
- wherein the method further comprises magnetizing the particle dispersion layer installed in the spacecraft to obtain the persistent magnetic field having the target directionality.

19. A spacecraft, comprising:
- a body defining an interior payload region;
- a particle dispersion layer disposed between the interior payload region and one or more exterior surfaces of the body, the particle dispersion layer formed of multiple particle dispersion layer portions, each particle dispersion layer portion including a sheet magnet producing a persistent magnetic field, the persistent magnetic field of each particle dispersion layer portion having a different directionality than each other particle dispersion layer portion along a midplane of the particle dispersion layer; and a mass shielding layer disposed between the particle dispersion layer and the one or more exterior surfaces of the body.

20. The spacecraft of claim 19, wherein the particle dispersion layer forms a continuous layer that spans a three-dimensional projection of a volume of the interior payload region toward an outward-facing side of the one or more exterior surfaces of the body.

* * * * *